(12) United States Patent
Kosaka et al.

(10) Patent No.: US 7,433,575 B2
(45) Date of Patent: Oct. 7, 2008

(54) MPEG RECORDING AND PLAYBACK DEVICE

(75) Inventors: Hideaki Kosaka, Tokyo (JP); Tetsuro Shida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1176 days.

(21) Appl. No.: 10/161,661

(22) Filed: Jun. 5, 2002

(65) Prior Publication Data

US 2003/0118317 A1    Jun. 26, 2003

(30) Foreign Application Priority Data

Dec. 26, 2001    (JP)    ............................ P2001-394043

(51) Int. Cl.
  *H04N 5/91*    (2006.01)
(52) U.S. Cl. ............................ 386/46; 386/95; 386/124
(58) Field of Classification Search .................. 386/46, 386/68, 70, 95, 109–112, 124–131; 348/441, 348/510, 521, 522, 536, 542, 554, 705, 706
See application file for complete search history.

(56) References Cited

U.S. PATENT DOCUMENTS 6,397,000 B1 *    5/2002    Hatanaka et al. .............. 386/98

6,813,437 B2 *    11/2004    Ando et al. .................... 386/95
7,221,856 B2 *    5/2007    Himeno et al. .............. 386/105

FOREIGN PATENT DOCUMENTS

| JP | 08340514 | 12/1996 |
| JP | 09326993 | 12/1997 |
| JP | 10191189 | 7/1998 |
| JP | 275109 | 10/2001 |

* cited by examiner

*Primary Examiner*—Thai Tran
*Assistant Examiner*—Mishawn Dunn
(74) *Attorney, Agent, or Firm*—Birch, Stewart, Kolasch & Birch, LLP (57) ABSTRACT

An MPEG recording and playback device is provided which can provide pertinent information on a program being played back to viewers at least in certain forms with certainty, thereby facilitating viewers' convenience. In this MPEG recording and playback device, during recording of MPEG data, a program information collecting unit (14) collects pertinent information on program responsive to an input path of the MPEG data by changing a method of collection, and the pertinent information on program is recorded in a different location of a track from that for the MPEG data. During playback, recorded pertinent information on program is outputted after being superimposed on an MPEG decoded analog image signal.

3 Claims, 6 Drawing Sheets

FIG. 2A MPEG Transport Packet

FIG. 2B Sync Block

FIG. 2C ECC Structure

FIG. 2D Data Position on the Tape

TP: Track Pair Number
T: Track Number
S: Sync Block Number

FIG. 3A

MPEG-TS Packet

| Sync | ID | Main Header | Data AUX | Packet Header | MPEG Transport Packet (188Bytes) | Inner Parity |
|------|----|-----|------|--------|-------------|--------|
| 2 | 3 | 2 | 1 | 4 | 92 | 8 |

1 Sync block = 112 Bytes

FIG. 3B

Pack Structure

| Sync Block No. | Contents |
|---|---|
| 6n | PC0(Pack) |
| 6n+1 | PC1 |
| 6n+2 | PC2 |
| 6n+3 | PC3 |
| 6n+4 | PC4 |
| 6n+5 | PC5 |

FIG. 3C

Pack Data

| Pack Header | Data | Pack Header | Data |
|---|---|---|---|
| 0×00 | No Info(Vender Unique) | 0×07 | TRANSPARENT |
| 0×01 | CASSETTE ID | 0×04,0×05 | ISRC |
| 0×19 | ABSOLUTE TIME CODE | 0×06 | MARKER |
| 0×18 | OPTIONAL TIME CODE | 0×30 | TOC OF START POINT |
| 0×11 | TOTAL TIME | 0×31 | TOC OF PROGRAM INFORMATION |
| 0×02 | REC DATE | 0×32 | PROGRAM INFORMATION |
| 0×10 | REC TIME | 0×12 | PROGRAM TOTAL TIME |
| 0×03 | SOURCE(TV CH etc) | 0×1A | PROGRAM TIME CODE |
| 0×20-0×27 | TEXT HEADER | 0×13 | INDEX TOTAL TIME |
| 0×28-0×2F | TEXT DATA | 0×1B | INDEX TIME CODE |

MPEG RECORDING AND PLAYBACK DEVICE

BACKGROUND OF THE INVENTION

1. Field of the Invention

The present invention relates to an MPEG recording and playback device, and more specifically to collection, recording and playback of data relating to MPEG data by the MPEG recording and playback device.

2. Description of the Background Art

Figure 6:
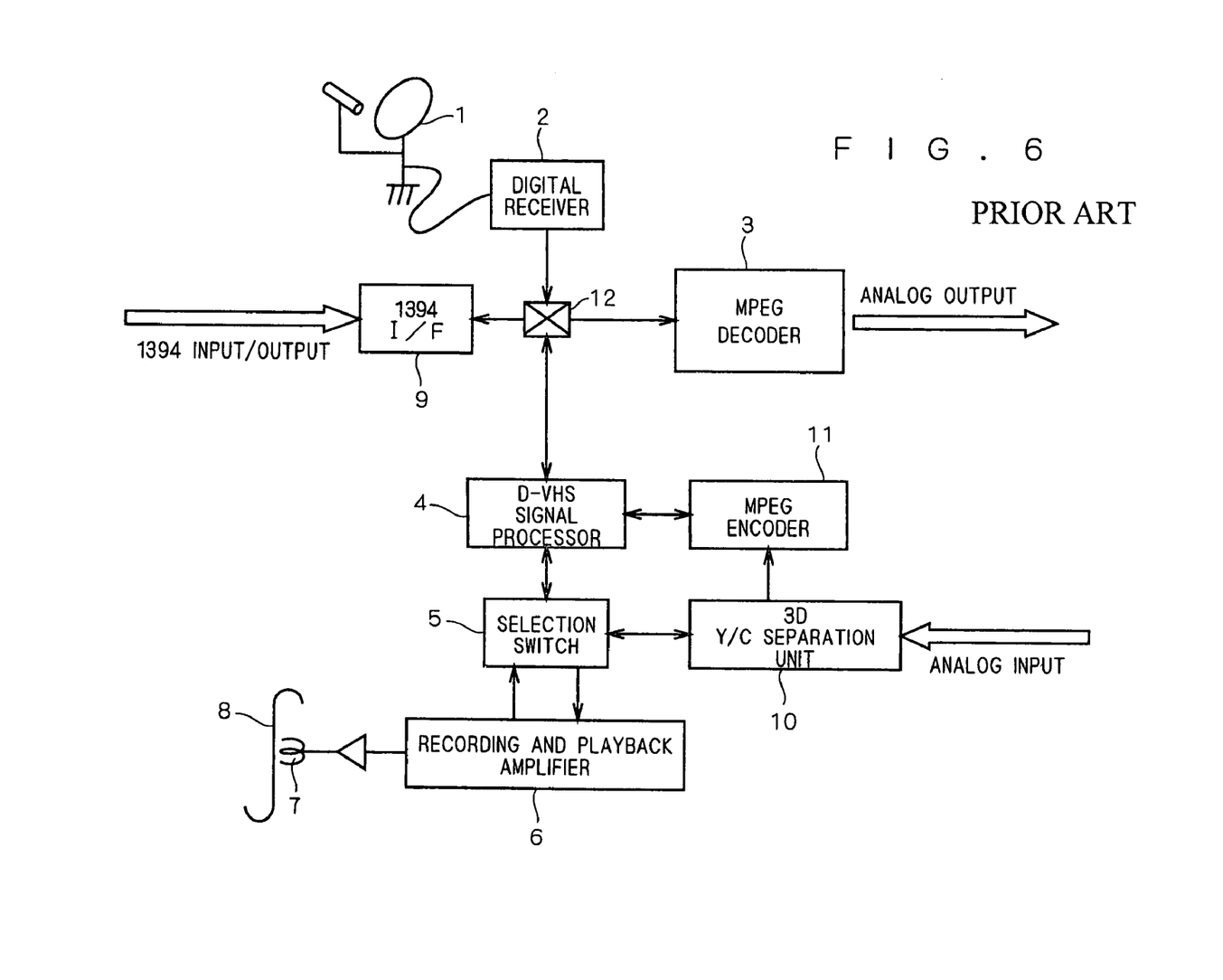
FIG. 6 is a block diagram of a conventional MPEG recording and playback device.

FIG. 6 is a block diagram of a conventional MPEG recording and playback device, illustrating a conceptual view of paths of recording and playback of D-VHS analog signals and digital data by the conventional MPEG recording and playback device having a digital broadcast receiving function and an IEEE 1394 interface.

This MPEG recording and playback device, as shown in FIG. 6, comprises an antenna 1, a digital receiver 2, an MPEG decoder 3, a D-VHS signal processor 4, a selection switch 5, a recording and playback amplifier 6, a rotating head 7, a magnetic tape 8, an IEEE 1394 interface (I/F) 9, a three-dimensional (3D) Y/C separation unit 10, an MPEG encoder 11, and a changer 12.

The antenna 1 receives digital broadcasts. The digital receiver 2 is tuned to a broadcast wave received with the antenna 1 for digital demodulation and extracts MPEG data. The MPEG decoder 3 decodes MPEG data extracted by the digital receiver 2 and outputs analog image and audio signals.

The D-VHS signal processor 4, during recording of MPEG data, selectively receives any one of MPEG data extracted by the digital receiver 2, MPEG data obtained by encoding analog input as described later and MPEG data fed via the IEEE 1394 I/F 9, arranges the received MPEG data in a data structure defined by the D-VHS standard and, after adding an error correction code, converts and outputs it as a recording signal. During playback, the D-VHS signal processor 4 receives a digital playback signal from the selection switch 5 as described later and, after performing error correction processing, extracts and outputs an MPEG stream from the digital playback signal.

The selection switch 5, during recording, selects and outputs either digital recording signal output from the D-VHS signal processor 4 or analog recording signal output from analog input as described later. During playback, the selection switch 5 receives a playback signal from the recording and playback amplifier 6 as described later and outputs it to the D-VHS signal processor 4 or the 3D Y/C separation unit 10 depending on whether the signal is in analog or digital form.

The recording and playback amplifier 6, during recording, subjects a recording signal received from the selection switch 5 to waveform equalization and amplification, thereby to generate and output a magnetic recording signal. During playback, the recording and playback amplifier 6 performs processing such as waveform equalization and phase compensation on a signal read out by the rotating head 7 as described later for minimizing magnetic-media-specific waveform distortion and the like, thereby to output a playback signal. The rotating head 7 performs reading and writing of a recording signal from and to the magnetic tape 8. The IEEE 1394 I/F 9 exchanges an MPEG stream and a control command with external digital AV equipment in accordance with the IEEE 1394 standard.

With respect to analog input (analog image and audio signals) from outside, when the analog image signal is a composite signal, the 3D Y/C separation unit 10 outputs the image signal without any additional processing or after performing 3D Y/C separation processing to the selection switch 5 together with the analog audio signal. When the image signal is a Y/C signal, the 3D Y/C separation unit 10 outputs the image signal without any additional processing to the selection switch 5 together with the audio signal. Simultaneously with this output to the selection switch 5, the 3D Y/C separation unit 10 outputs an A/D converted audio signal and an image component signal such as a Y/C signal to the MPEG encoder 11 as described later.

The MPEG encoder 11 receives the image component signal and the A/D converted audio signal from the 3D Y/C separation unit 10 and performs MPEG encoding to generate and output MPEG data. The changer 12 selects an input/output signal from the digital receiver 2, the IEEE 1394 I/F 9, the MPEG decoder 3 and the D-VHS signal processor 4 and distributes the selected signal.

First, the act of recording MPEG data received from digital broadcasting on the magnetic tape 8 will be described with reference to FIG. 6. A broadcast wave received from digital broadcasting with the antenna 1 is subjected to processing such as channel selection, digital demodulation and error correction by the digital receiver 2 and is outputted as an MPEG stream.

The outputted MPEG stream is fed via the changer 12 to the D-VHS signal processor 4 and the MPEG decoder 3. The MPEG decoder 3 decodes the received MPEG stream to generate and output, for example, image and audio signals, thereby providing audio and video to viewers. The D-VHS signal processor 4 rearranges the received MPEG stream in a data format compliant with the D-VHS standard and, after adding an error correction code, outputs it as a recording signal to the selection switch 5.

The recording signal outputted from the selection switch 5 is fed to the recording and playback amplifier 6, in which the signal is formed into a waveform suitable for magnetic tape recording, converted into a magnetic recording signal, and outputted to the rotating head 7. This magnetic recording signal is recorded on the magnetic tape 8 by the rotating head 7.

Next, the act of recording MPEG data generated by encoding analog input signals from outside on the magnetic tape 8 will be described with reference to FIG. 6. Analog image and audio signals received from outside are fed to the 3D Y/C separation unit 10, in which the image signal is subjected to Y/C separation processing and fed to the MPEG encoder 11 together with the audio signal.

The MPEG encoder 11 performs MPEG encoding of the received image Y/C and audio signals, edits both the signals and a necessary data table, and transmits a result as an MPEG transport stream (hereinafter referred to as an "MPEG-TS") to the D-VHS signal processor 4.

The D-VHS signal processor 4 rearranges the received MPEG stream in a data format compliant with the D-VHS standard and, after adding an error correction code, outputs it as a recording signal to the selection switch 5.

The recording signal outputted from the selection switch 5 is fed to the recording and playback amplifier 6, in which the signal is formed into a waveform suitable for recording on the magnetic tape 8, converted into a magnetic recording signal, and outputted to the rotating head 7. This magnetic recording signal is recorded on the magnetic tape 8 by the rotating head 7.

Herein analog recording and playback in S-VHS or VHS modes using similar input signals, which are irrelevant to the present invention, will not be described.

Next, the act of recording MPEG data received from the IEEE 1394 I/F 9 on the magnetic tape 8 will be described with reference to FIG. 6. MPEG data received from the IEEE 1394 I/F 9 is transmitted via the changer 12 to the MPEG decoder 3 and the D-VHS signal processor 4.

The MPEG decoder 3 decodes the received MPEG stream to generate and output image and audio signals, thereby providing audio and video to viewers. The D-VHS signal processor 4 rearranges the received MPEG stream in a data format compliant with the D-VHS standard and, after adding an error correction code, outputs it as a recording signal to the selection switch 5.

The recording signal outputted from the selection switch 5 is fed to the recording and playback amplifier 6, in which the signal is formed into a waveform suitable for magnetic tape recording, converted into a magnetic recording signal, and outputted to the rotating head 7. This magnetic recording signal is recorded on the magnetic tape 8 by the rotating head 7.

Finally, the act of playing back and MPEG decoding MPEG data recorded on the magnetic tape 8 will be described with reference to FIG. 6. MPEG data recorded on the magnetic tape 8 is converted from a magnetic pattern into an electric signal by the rotating head 7 and fed to the recording and playback amplifier 6.

The recording and playback amplifier 6 performs processing such as waveform equalization and phase compensation on the received electric signal for minimizing magnetic-medium-specific waveform distortion and the like, and transmits the processed electric signal as a playback signal via the selection switch 5 to the D-VHS signal processor 4.

The D-VHS signal processor 4 creates a data block compliant with the D-VHS standard for the playback signal received from the selection switch 5 and, after performing error correction processing, decomposes data into MPEG-TS packets to construct MPEG data. The MPEG data is then fed via the changer 12 to the MPEG decoder 3.

The MPEG decoder 3 performs image and audio decoding through processing necessary for MPEG decoding on the received MPEG data such as filtering for extracting image and audio data and retrieval of time-stamp information for use in defining the timing of decoding, and then outputs resultant analog image and audio signals to the outside.

The MPEG decoder 3 also extracts pertinent information on program, called SI (Service Information) data, from the received MPEG data and, by interpreting the information, provides pertinent information on a program being played back such as the title of the program and the duration of the broadcast time of the program.

As above described, in the conventional MPEG recording and playback device, only the MPEG decoder 3 can handle pertinent information on program. Thus, MPEG recording and playback devices which are not equipped with an MPEG decoder cannot handle pertinent information on program and accordingly cannot provide pertinent information on a program being played back to viewers.

Further, when an MPEG recording and playback device which is not equipped with an MPEG decoder is connected to a digital TV or set top box (STB) equipped with an MPEG decoder, the digital TV or STB cannot know whether the MPEG recording and playback device connected thereto has storage for pertinent information on program and thus cannot transmit proper pertinent information on program to the MPEG recording and playback device. Further, the MPEG decoder may not have the function of displaying pertinent information on a program being played back.

SUMMARY OF THE INVENTION

The present invention has been devised to solve the aforementioned problems and an object thereof is to provide an MPEG recording and playback device capable of providing pertinent information on a program being played back to viewers at least in certain forms with certainty, thereby facilitating viewers' convenience.

According to the present invention, the MPEG recording and playback device for recording and playing back MPEG data on a tape recording medium, comprises information collecting means, recording means, information extracting means, and output means. The information collecting means is for, during recording of received MPEG data, collecting pertinent information on program contained in the MPEG data. The recording means is for recording the pertinent information on program collected by the information collecting means in an area of a recording track which is different from an area where the MPEG data is recorded, on the tape recording medium. The information extracting means is for, during playback of the MPEG data recorded on the tape recording medium, extracting the pertinent information on program from the contents of recording on the tape recording medium. The output means is for outputting the pertinent information on program extracted by the information extracting means.

In this MPEG recording and playback device, during recording of MPEG data, the information collecting means collects pertinent information on program in the MPEG data and the recording means records the pertinent information on program in an area of a recording track which is different from an area where the MPEG data is recorded, on the tape recording medium. During playback of MPEG data, the information extracting means extracts pertinent information on program from the contents of recording on the tape recording medium and the output means outputs the pertinent information on program. From this, even equipment which is not equipped with an MPEG decoder can handle pertinent information on program and can provide pertinent information on a program being played back to viewers in certain forms with certainty, thereby facilitating viewers' convenience.

Preferably, in the MPEG recording and playback device, the information collecting means changes a method of collecting the pertinent information on program according to an input path of the MPEG data to the MPEG recording and playback device.

This MPEG recording and playback device can collect pertinent information on program responsive to the input path of the MPEG data.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
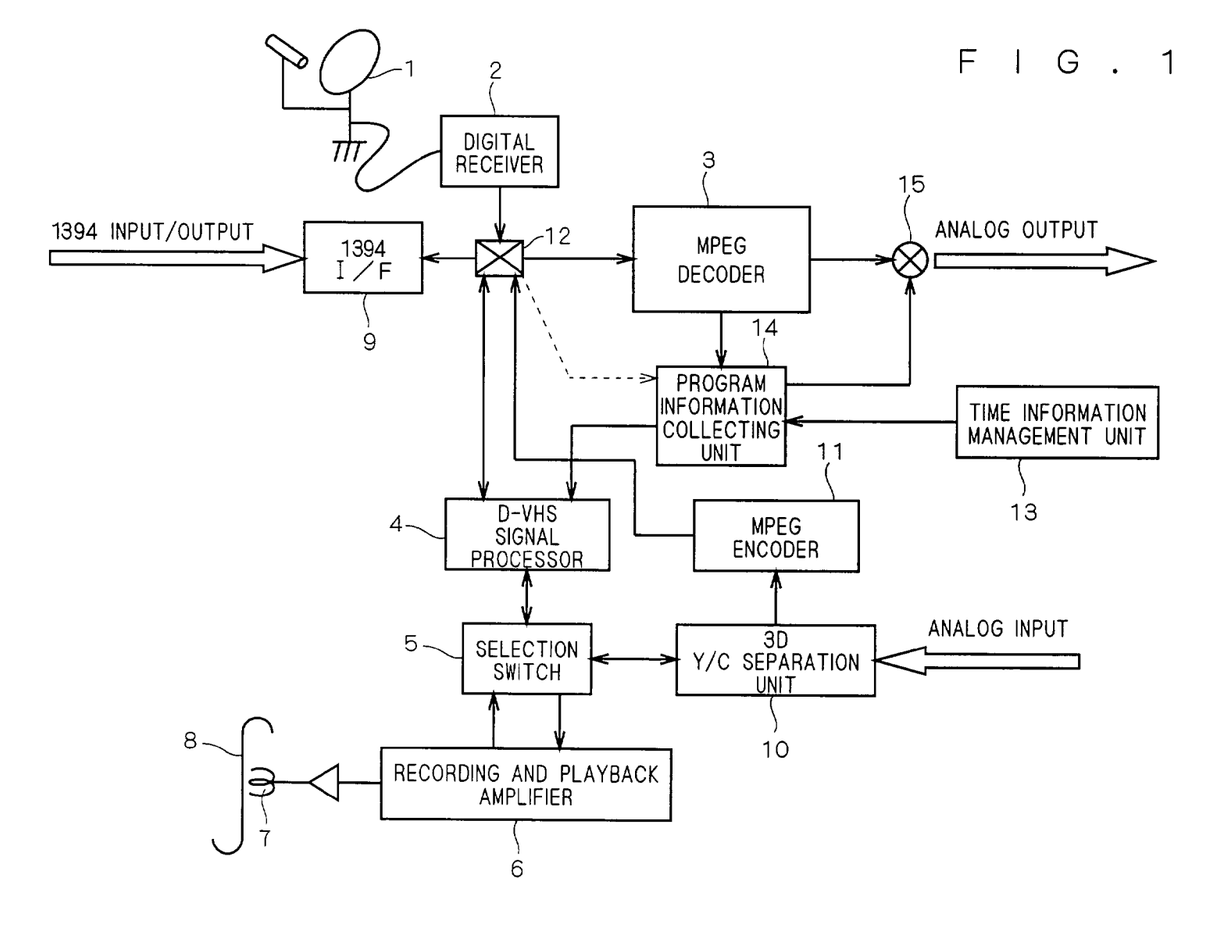
FIG. 1 is a block diagram of an MPEG recording and playback device according to a first preferred embodiment of the present invention.

FIG. 1 is a block diagram of an MPEG recording and playback device according to a first preferred embodiment of the present invention. This MPEG recording and playback device, as shown in FIG. 1, comprises a time information management unit 13, a program information collecting unit 14 and a display superimposing unit 15 additional to the configuration of the MPEG recording and playback device of FIG. 6. Of the components in the MPEG recording and playback device according to this preferred embodiment, those corresponding to the components in the device of FIG. 6 are denoted by the same reference numerals and the description thereof will be omitted.

In this preferred embodiment, the program information collecting unit 14 corresponds to program information collecting means and program information extracting means according to the present invention; the D-VHS signal processor 4, the recording and playback amplifier 6 and the rotating head 7 correspond to recording means; and the display superimposing unit 15 corresponds to output means.

The time information management unit 13 has a clock function and outputs the current date and time, as necessary, to the program information collecting unit 14 as described later. The program information collecting unit 14, according to input information (information about an input path of MPEG data) received from the changer 12, to be described later, collects pertinent information on program through at least one of the MPEG decoder 3 and the time information management unit 13. The display superimposing unit 15 superimposes and outputs the permanent information on program collected by the program information collecting unit 14 as a text form on an analog image signal which is generated by the MPEG decoder 3 decoding MPEG data.

Figure 2A:
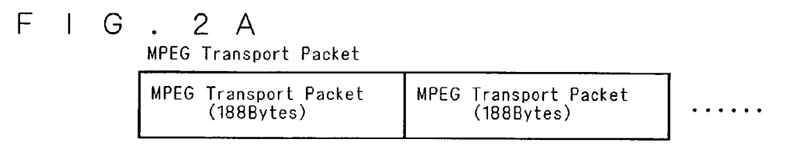
FIGS. 2A to 2D are conceptual views illustrating data structures compliant with the D-VHS standard during MPEG recording.
Figure 2B:
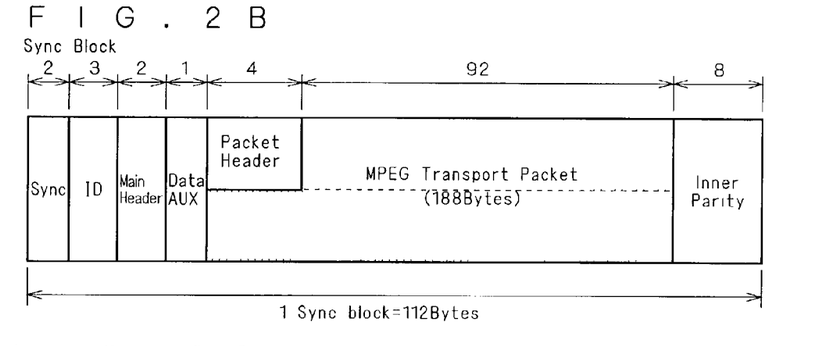
Figure 2C:
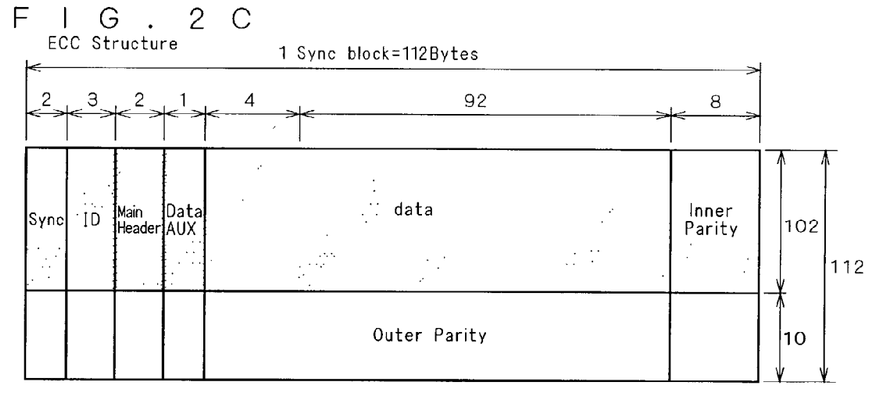
Figure 2D:
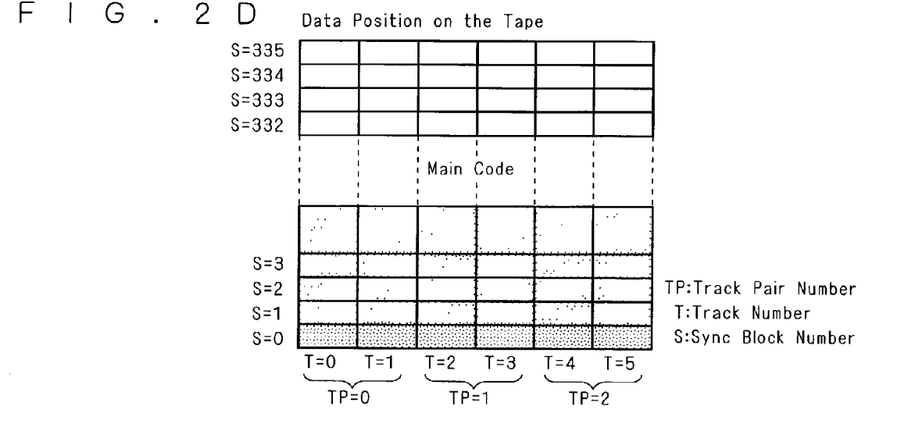

FIGS. 2A to 2D are conceptual views illustrating data structures compliant with the D-VHS standard during MPEG recording. FIG. 2A shows MPEG-TS packets transmitted by the IEEE 1394 or a digital broadcast wave. FIG. 2B shows sync blocks configured to store one of the MPEG-TS packet of FIG. 2A and given inner digital error correction (inner parity). FIG. 2C shows an ECC (Error Correction Code) data structure configured to include the sync blocks of FIG. 2B and given outer digital error correction (outer parity). FIG. 2D shows data arranged on an actual tape, including a plurality of ECC data structures of FIG. 2C.

First, the operation of the MPEG recording and playback device according to the first preferred embodiment of the present invention when receiving a digital broadcast wave and recording MPEG data and pertinent information on program will be described with reference to FIG. 1. A broadcast wave received from digital broadcasting with the antenna 1 is subjected to processing such as channel selection, digital demodulation and error correction by the digital receiver 2 and is outputted as MPEG data.

The outputted MPEG stream is fed via the changer 12 to the D-VHS signal processor 4 and the MPEG decoder 3. At this time, the changer 12 recognizes that the MPEG data is input from the digital receiver 2 and transmits it as input information to the program information collecting unit 14.

The MPEG decoder 3 decodes the received MPEG stream to generate image and audio signals and outputs those signals to the display superimposing unit 15. Except during D-VHS playback, the display superimposing unit 15 basically outputs the received image and audio signals without any additional processing (analog output), providing the same to viewers. The image and audio signals outputted from the display superimposing unit 15 are outputted as video and audio with, for example, a display unit and an output device (not shown) with a speaker.

Now, how the MPEG data is arranged in a D-VHS format on a tape will be described with reference to FIG. 2. The MPEG data fed to the D-VHS signal processor 4 is formatted in an MPEG-TS packet data structure as shown in FIG. 2A. The D-VHS signal processor 4 converts this packet data into data structures called sync blocks as shown in FIG. 2B. At this time, a single packet of MPEG-TS data is divided and arranged into two sync blocks, to which a sync, an ID, a main header, a packet header and inner parity bits are added. The sync includes a sync word composed of 16 bits. The ID includes a track pair number indicating which of a plurality of rotating heads scan each track and a sequence number indicating the position of a track in a data structure during one rotation of a rotating head. The main header includes a format ID indicating, for example, a structure of recording data, a CGMS (copy generation management system) flag which is copy control information, and the like. Data AUX is a data format called pack and includes data defined freely by a vendor as well as a cassette ID and an absolute-time counter value. The packet header includes, for example, information indicating the timing of input of the MPEG-TS packet to the D-VHS signal processor 4.

Figure 3A:
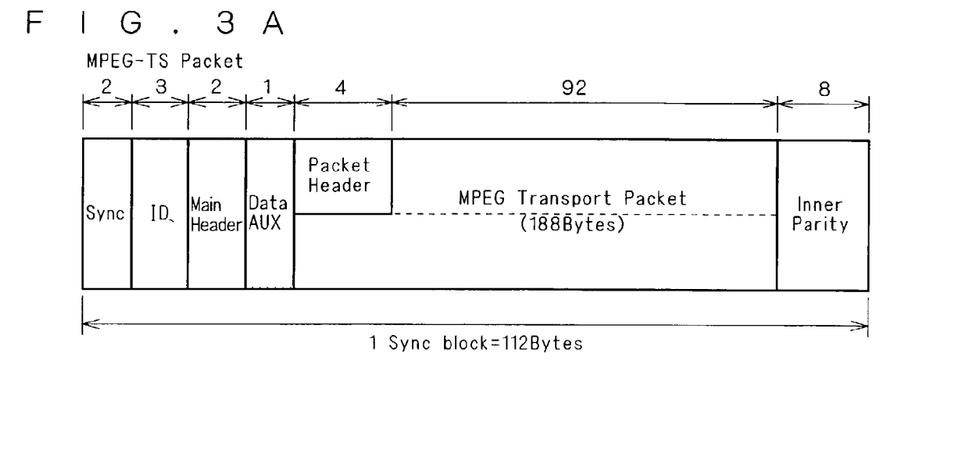
FIGS. 3A to 3C illustrate data structures of pack data compliant with the D-VHS standard.
Figure 3B:
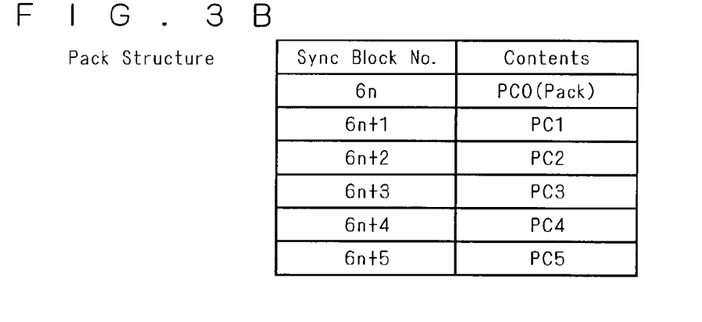

Next, the structure of pack data will be described with reference to FIG. 3. Pack data is stored in Data AUX in D-VHS format data as shown in FIG. 3A. Since sync blocks, as shown in FIG. 2D, are located extending over 6 consecutive tracks on the magnetic tape 8, six bytes of data in Data AUX as shown in FIG. 3B, each byte being contained in one sync block, constitute one pack data. Each pack data can hold various kinds of data according to the value of its pack header. For example, REC DATE and REC TIME store the date and time of recording, and No Info, TEXT HEADER and TEXT DATA store pertinent information on program.

The program information collecting unit 14, according to the input information from the changer 12, extracts pertinent information on program through the MPEG decoder 3. MPEG data, when being input from digital broadcasting, holds pertinent information on program in a data structure defined independently by each broadcasting; therefore, the program information collecting unit 14 extracts pertinent information on program in a data structure defined as above described. In Japan, for example, pertinent information on program is transmitted in a user-dependent table structure in accordance with the MPEG standard on the basis of the guidelines set by the ARIB (Association of Radio Industries and Businesses) and such regulations are applied to both satellite and terrestrial broadcasting without distinction. In this case, pertinent information on program is obtained by extracting a predetermined table in MPEG data, e.g., SI (Service Information), according to the ARIB specification.

On the other hand, in the United States or other countries, a plurality of digital broadcasts can be received in each part of the country and additionally, those broadcasts may be based on different broadcasting standards. In this case, the device must comply with any data structure of pertinent information on program defined by all expected broadcasting standards. The program information collecting unit 14 selects an extraction method for obtaining proper pertinent information on program by sequentially extracting information compliant with each preset broadcasting standard, and then extracts and outputs pertinent information on program to the D-VHS signal processor 4.

Now, in some cases, the contents of a program may have changed during recording due to a channel change by the viewer's operation or the start and end of the program. The program information collecting unit 14 is, therefore, configured to detect a program change by checking the contents of at least one of the SI or PSI (Program Specific Information) in received MPEG data at regular time intervals. When a program change is detected, the program information collecting unit 14 obtains and updates pertinent information on program after the program change on the basis of the SI in the MPEG data and outputs the updated information to the D-VHS signal processor 4. In this preferred embodiment, a program change is detected by checking the contents of at least one of a PAT (Program Association Table) and a PMT (Program Map Table) contained in the PSI at regular time intervals.

In the above process of extracting pertinent information on program after selecting an extraction method for obtaining proper information by sequentially extracting pertinent information on program compliant with each preset broadcasting standard, if pertinent information on program cannot be obtained by any extraction method compliant with all expected broadcasting standards, at least one of time information such as the date and time of the start of recording obtained by the time information management unit 13 and a program number contained within the PMT in MPEG data received from the MPEG decoder 3 is outputted as pertinent information on program to the D-VHS signal processor 4.

In the above case, when the contents of the program have changed during recording due to for example a channel change, the following processing is performed. That is, the program information collecting unit 14 detects a program change by checking the contents of at least one of the PAT or PMT in received MPEG data at regular time intervals and, when a program change is detected, obtains and updates pertinent information on program after the program change and outputs the updated information to the D-VHS signal processor 4.

Here, the received MPEG data may contain a plurality of programs, in which case it is possible to process only the PMT of a viewer-selected program selected at the time of channel selection.

Figure 3C:
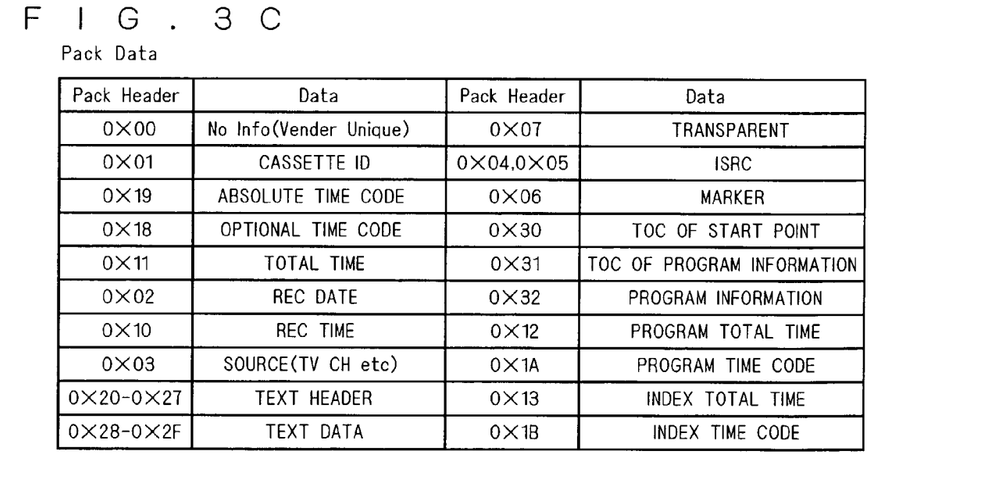

As previously described, MPEG data fed to the D-VHS signal processor 4 as shown in FIG. 1 is rearranged in a data format compliant with the D-VHS standard as shown in FIGS. 2 and 3 and, after addition of an error correction code, outputted as a recording signal. At this time, as pack data to be stored in Data AUX, pertinent information on program fed from the program information collecting unit 14 is stored in a "No Info" or "TEXT DATA" field. For example, information about the date and time of the start of recording is recorded as REC DATE and REC TIME in the pack data as shown in FIG. 3, information about program such as the title and the contents of the program is stored as TEXT DATA, and pertinent information on channel such as a program number is stored as SOURCE. The recording data formatted in a predetermined data structure by the D-VHS signal processor 4 is fed via the selection switch 5 to the recording and playback amplifier 6.

The recording data fed to the recording and playback amplifier 6 is formed in a waveform suitable for magnetic tape recording and converted and outputted as a magnetic recording signal. This magnetic recording signal is recorded on the magnetic tape 8 by the rotating head 7.

Next, the operation of the MPEG recording and playback device according to the first preferred embodiment of the present invention when recording pertinent information on program and MPEG data generated through MPEG encoding of received analog image and audio signals will be described with reference to FIG. 1. Analog image and audio signals received from outside are fed to the 3D Y/C separation unit 10, in which the image signal is subjected to Y/C separation processing and, after A/D conversion, fed together with the audio signal to the MPEG encoder 11.

The MPEG encoder 11 performs MPEG encoding of the received image Y/C signal and audio signal, edits those signals and a necessary data table, and transmits a result as MPEG-TS data via the changer 12 to the D-VHS signal processor 4 and the MPEG decoder 3. At this time, the changer 12 recognizes that the MPEG data is input from the MPEG encoder 11 and transmits it as input information to the program information collecting unit 14.

The MPEG decoder 3 decodes the received MPEG stream to generate image and audio signals and outputs those signals to the display superimposing unit 15. Except during D-VHS playback, the display superimposing unit 15 outputs the received image and audio signals without any additional processing, providing the same to viewers.

The program information collecting unit 14, according to the input information from the changer 12, extracts pertinent information on program through the MPEG decoder 3. MPEG data, when being input from the MPEG encoder 11 built in the MPEG recording and playback device of this preferred embodiment, unlike MPEG data from digital broadcasting, does not hold pertinent information on program which is formatted in a data structure defined independently by each broadcasting. Thus, the program information collecting unit 14 obtains an MPEG-compliant PMT data table through the MPEG decoder 3, obtains a program number within the PMT, subjects the program number to binary-to-decimal conversion to obtain a channel number, and obtains date and time information at the time when the time information management unit 13 started recording. The obtained information makes pertinent information on program used for processing.

In the above case, when the contents of a program have changed during recording due to for example a channel change, the following processing is performed. That is, the program information collecting unit 14 detects a program change by checking the contents of at least one of the PAT and the PMT in received MPEG data at regular time intervals and, when a program change is detected, obtains and updates pertinent information on program after the program change and outputs the updated information to the D-VHS signal processor 4.

A subsequent process of recording the MPEG data and the pertinent information on program obtained by the program information collecting unit 14 on the magnetic tape 8 is identical to that previously described for the input from digital broadcasting; therefore, the description thereof will be omitted.

Next, the operation of the MPEG recording and playback device according to the first preferred embodiment of the present invention when recording MPEG data received via the IEEE 1394 I/F 9 and pertinent information on program will be described with reference to FIG. 1. MPEG data received from the IEEE 1394 I/F 9 is fed via the changer 12 to the MPEG decoder 3 and the D-VHS signal processor 4.

The MPEG decoder 3 decodes the received MPEG stream to generate image and audio signals and outputs those signals to the display superimposing unit 15. Except during D-VHS playback, the display superimposing unit 15 outputs the received image and audio signals without any additional processing, providing the same to viewers.

The program information collecting unit 14, according to the input information from the changer 12, extracts pertinent information on program through the MPEG decoder 3. MPEG data, when being input from the IEEE 1394 I/F 9 built in the MPEG recording and playback device of this preferred embodiment, unlike MPEG data from digital broadcasting, may not hold pertinent information on program which is formatted in a data structure defined independently by each broadcasting. Thus, the program information collecting unit 14 obtains an MPEG-compliant PMT data table through the MPEG decoder 3, obtains a program number within the PMT, subjects the program number to binary-to-decimal conversion to obtain a channel number, and obtains date and time information at the time when the time information management unit 13 started recording. The obtained information makes pertinent information on program used for processing.

A subsequent process of recording the MPEG data and the pertinent information on program obtained by the program information collecting unit 14 on the magnetic tape 8 is identical to that previously described for the input from digital broadcasting; therefore, the description thereof will be omitted. Further, the processing when the contents of the program have changed during recording due to for example a channel change is also identical to that previously described for the case of MPEG encoding and recording analog input.

Next, the operation of the MPEG recording and playback device according to the first preferred embodiment of the present invention when playing back MPEG data and pertinent information on program will be described with reference to FIG. 1. MPEG data recorded on the magnetic tape 8 is converted from a magnetic pattern into an electric signal by the rotating head 7 and fed to the recording and playback amplifier 6.

The recording and playback amplifier 6 performs processing such as waveform equalization and phase compensation on the received electric signal for minimizing magnetic-media-specific waveform distortion and the like, and transmits a resultant signal as a playback signal via the selection switch 5 to the D-VHS signal processor 4.

The D-VHS signal processor 4 creates a data block compliant with the D-VHS standard for the playback signal received from the selection switch 5. After performing error correction processing, the D-VHS signal processor 4 decomposes data into MPEG-TS packets and transmits resultant MPEG data via the changer 12 to the MPEG decoder 3.

The D-VHS signal processor 4 also extracts pack data stored in the previously described Data AUX and transmits it to the program information collecting unit 14. The program information collecting unit 14 obtains necessary data for display from pertinent information on program received from the D-VHS signal processor 4 to generate text data and transmits it to the display superimposing unit 15. For example, a channel number can be obtained from SOURCE in the pack data and the date and time of the start of recording from REC Date and REC TIME.

The MPEG decoder 3 decodes the received MPEG stream to generate image and audio signals and outputs those signals to the display superimposing unit 15. During D-VHS playback, the display superimposing unit 15 superimposes and outputs display data which is the pertinent information on program received from the program information collecting unit 14, on the received image and audio signals, providing the same to viewers.

As above described, the MPEG recording and playback device according to the first preferred embodiment of the present invention, during recording of MPEG data, changes a method of collecting pertinent information on program according to an input path of data, and arranges and records obtained pertinent information on program in a different location on the same track from that for MPEG data to be recorded. During playback, the MPEG recording and playback device superimposes and outputs recorded pertinent information on program on an MPEG decoded analog image signal. From this, the MPEG recording and playback device can provide additional information on a program being recorded or played back to viewers in certain forms.

Even if the contents of a program have changed during recording of MPEG data, this MPEG recording and playback device can automatically obtain and provide pertinent information on program after the program change.

Second Preferred Embodiment

Figure 4:
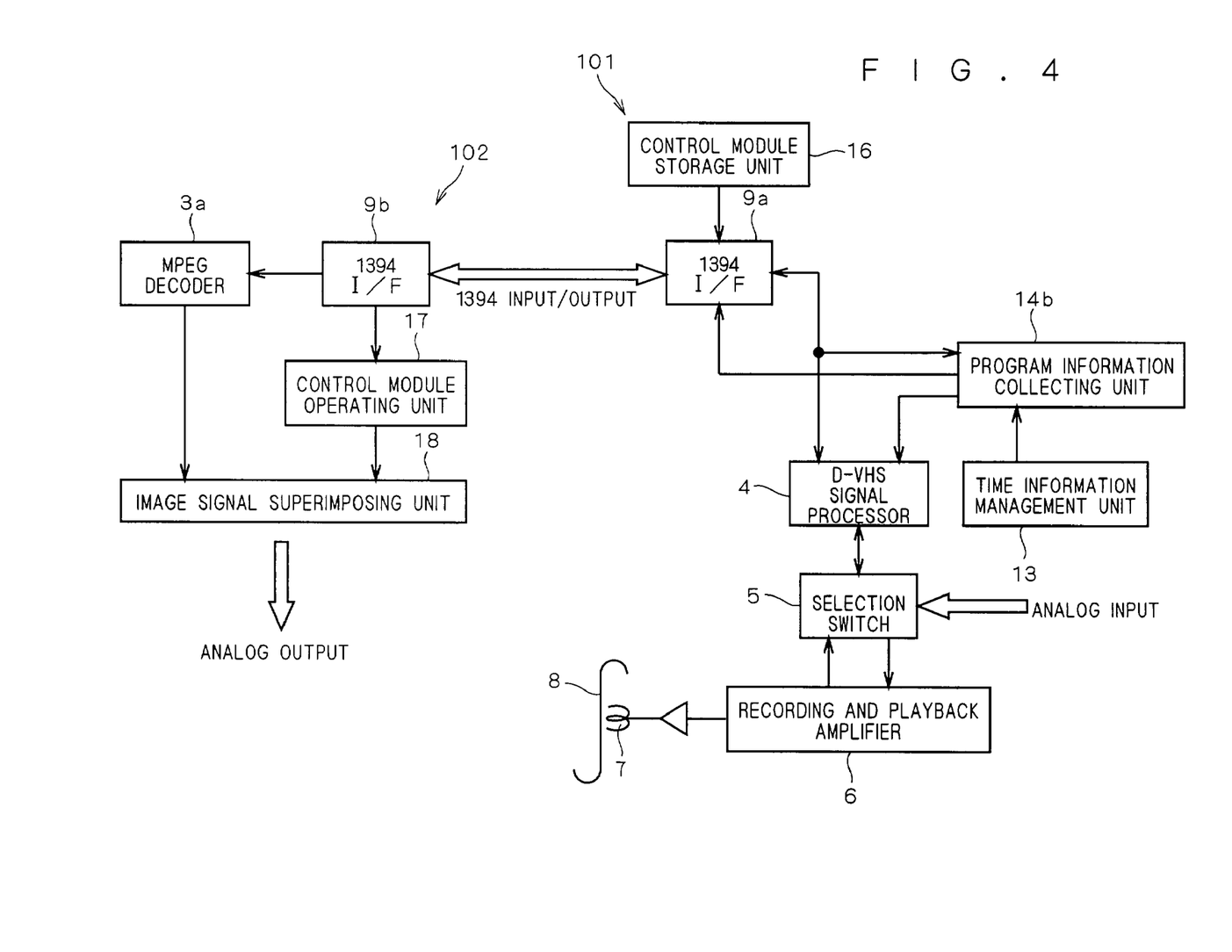
FIG. 4 is a block diagram of an MPEG recording and playback device and external equipment connected thereto according to a second preferred embodiment of the present invention.

FIG. 4 is a block diagram of an MPEG recording and playback device and external equipment connected thereto according to a second preferred embodiment of the present invention.

A substantial difference between an MPEG recording and playback device 101 according to the second preferred embodiment of the present invention and the device according to the first preferred embodiment lies only in that the device 101 saves the need for the antenna 1, the digital receiver 2, the MPEG decoder 3, the 3D Y/C separation unit 10, the MPEG encoder 11, the changer 12 and the display superimposing unit 15 in the device configuration of FIG. 1 and instead, additionally comprises a control module storage unit 16. In the MPEG recording and playback device 101 according to this preferred embodiment, like or corresponding parts to those described in FIG. 1 are denoted by the same reference numerals and the description thereof will be omitted. In this preferred embodiment, an IEEE 1394 I/F 9a corresponds to output means according to the present invention.

The IEEE 1394 I/F 9a exchanges an MPEG stream, a control module and a control command with external equipment 102 in accordance with the IEEE 1394 standard. A program information collecting unit 14b, in addition to having substantially the same function as the previously described program information collecting unit 14, obtains, during playback, information pertinent to a program being played back from the D-VHS signal processor 4 and transmits it to the IEEE 1394 I/F 9a. The control module storage unit 16 stores a control module defining its own control procedure, which is to be transmitted to external control equipment, under a scheme such as the HAVi specification described later.

The external equipment 102 comprises an MPEG decoder 3a, an IEEE 1394 I/F 9b, a control module operating unit 17, and an image signal superimposing unit 18. The MPEG decoder 3a is connected via the IEEE 1394 I/F 9b over IEEE 1394 to the MPEG recording and playback device 101 and decodes MPEG data fed from the MPEG recording and playback device 101. The IEEE 1394 I/F 9b exchanges an MPEG stream, a control module and a control command with the MPEG recording and playback device 101 in accordance with the IEEE 1394 standard and, during playback, transmits pertinent information on program given from the program information collecting unit 14b to the external equipment 102 according to an IEEE 1394 protocol. The control module operating unit 17 obtains a control module held in the MPEG recording and playback device 101 via the IEEE 1394 I/F 9b and activates the module. The image signal superimposing unit 18 superimposes an image signal generated by the control module operating unit 17 formatting pertinent information on program in text form and an image signal generated by the MPEG decoder 3a decoding MPEG data, and outputs a result for display, for example.

First, a description is made of the operation of the MPEG recording and playback device 101 according to the second preferred embodiment when outputting reproduced pertinent information on program for display on the external equipment 102, for example. Here, the operation of the MPEG recording and playback device 101 when recording MPEG data fed via the IEEE 1394 I/F 9a on the magnetic tape 8 through for example, the D-VHS signal processor 4 is identical to that described in the first preferred embodiment of the present invention and thus, the description thereof will be omitted.

The MPEG recording and playback device 101 shown in FIG. 4, like the device according to the first preferred embodiment, can record pertinent information on program on the magnetic tape 8. MPEG data recorded on the magnetic tape 8 is converted from a magnetic pattern into an electric signal by the rotating head 7 and fed to the recording and playback amplifier 6.

The recording and playback amplifier 6 performs processing such as waveform equalization and phase compensation on the received electric signal for minimizing magnetic-media-specific waveform distortion and the like, and transmits a resultant signal as a playback signal via the selection switch 5 to the D-VHS signal processor 4.

The D-VHS signal processor 4 creates a data block compliant with the D-VHS standard for the playback signal fed from the selection switch 5, decomposes data into MPEG-TS packets after performing error correction processing, and outputs resultant MPEG data via the IEEE 1394 I/F 9a to the external equipment 102. The outputted MPEG data is fed via the IEEE 1394 I/F 9b to the MPEG decoder 3.

The D-VHS signal processor 4 also extracts pack data stored in the previously described Data AUX and gives it to the program information collecting unit 14b. The program information collecting unit 14b transmits pertinent information on program obtained from the D-VHS signal processor 4 via the IEEE 1394 I/F 9a to the external equipment 102.

Recently, various forms of digital home appliances compliant with the IEEE 1394 standard have been proposed and standards for such appliances have been developed. The HAVi (Home Audio Video Interoperability) is one of such standards. In the HAVi standard, to-be-controlled equipment controlled by other equipment contains a control module defining its own control procedure and transmits this control module over IEEE 1394 to the control equipment. The control equipment executes this control module in its operating environment thereby to gain control over the to-be-controlled equipment.

Referring to FIG. 4, the control module storage unit 16 in the MPEG recording and playback device 101 stores a control module previously provided for controlling the MPEG recording and playback device 101 by external equipment such as 102. For example in the case of HAVi-compliant equipment, after connecting control equipment and to-be-controlled equipment, a control module is retrieved by communication therebetween in the operating environment of the control equipment and expanded for activation. The control module has means for receiving pertinent information on program according to the IEEE 1394 protocol and the IEEE 1394 I/F 9a correspondingly has means for transmitting pertinent information on program. Thereby pertinent information on program transmitted from the MPEG recording and playback device 101 can be received on the external equipment side over IEEE 1394. Such specific data exchange between equipment connected with each other according to the IEEE 1394 protocol can be implemented with ease by the use of, for example, a command unique to a vendor according to the AV/C Digital Interface Command specification defined by the 1394 TA (Trade Association).

The pertinent information on program outputted from the IEEE 1394 I/F 9a is transmitted together with MPEG data over IEEE 1394 to the IEEE 1394 I/F 9b. The IEEE 1394 I/F 9b receives and transfers the pertinent information on program to the control module operating unit 17. The control module operating unit 17, which executes a previously obtained control module for the MPEG recording and playback device 101, converts and outputs the received pertinent information on program as a displayable image signal.

The MPEG data received at the IEEE 1394 I/F 9b is fed to the MPEG decoder 3a, in which it is MPEG decoded into an analog image signal and outputted to the image signal superimposing unit 18 together with the analog image signal obtained by the control module operating unit 17 converting the pertinent information on program. The image signal superimposing unit 18 superimposes both the received image signals and outputs one image signal, thereby providing the same to viewers.

As above described, the MPEG recording and playback device 101 according to the second preferred embodiment of the present invention transmits a control module defining its own control procedure over IEEE 1394 to external equipment (such as 102) so that it can be controlled by the external equipment on the basis of the control module. At this time, the MPEG recording and playback device 101 also transmits pertinent information on program over IEEE 1394 to the external equipment in which the control module is executed. The external equipment then extracts pertinent information on program by interpreting the received information based on the control module, converts it into an image signal, and superimposes a resultant signal on an MPEG decoded image signal of a program. Thereby, program information can be displayed and provided to viewers.

Third Preferred Embodiment

Figure 5:
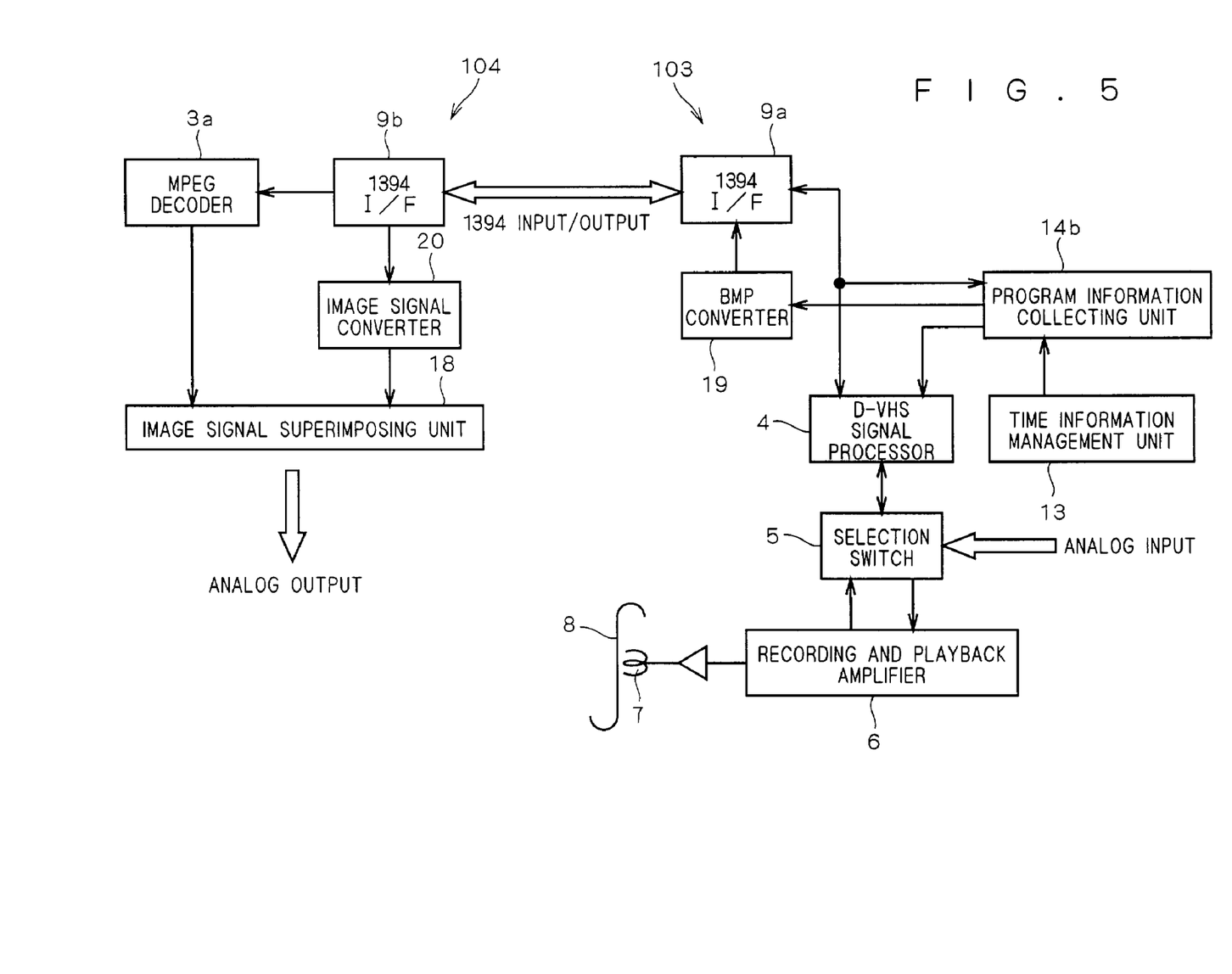
FIG. 5 is a block diagram of an MPEG recording and playback device and external equipment connected thereto according to a third preferred embodiment of the present invention.

FIG. 5 is a block diagram of an MPEG recording and playback device and external equipment connected thereto according to a third preferred embodiment of the present invention.

A substantial difference between an MPEG recording and playback device 103 according to the third preferred embodiment and the device according to the first preferred embodiment shown in FIG. 1 lies only in that the device 103 saves the need for the antenna 1, the digital receiver 2, the MPEG decoder 3, the 3D Y/C separation unit 10, the MPEG encoder 11, the changer 12 and the display superimposing unit 15 in the device configuration of FIG. 1 and instead, additionally comprises a bit map (BPM) converter 19. In the MPEG recording and playback device 103 according to this preferred embodiment, like or corresponding parts to those described in FIG. 1 are denoted by the same reference numerals and the description thereof will be omitted. In this preferred embodiment, the IEEE 1394 I/F 9a corresponds to output means according to the present invention.

The IEEE 1394 I/F 9a exchanges an MPEG stream and the like with external equipment 104 in accordance with the IEEE 1394 standard. The program information collecting unit 14b, in addition to having substantially the same function as the previously described program information collecting unit 14, obtains, during playback, pertinent information on a program being played back from the D-VHS signal processor 4 and transmits it to the IEEE 1394 I/F 9a. The BMP converter 19, during playback, converts the pertinent information on program fed from the program information collecting unit 14b into bit map data which is displayable pixel data, and outputs it via the IEEE 1394 I/F 9a to the external equipment 104.

The external equipment 104 comprises the MPEG decoder 3a, the IEEE 1394 I/F 9b, the image signal superimposing unit 18, and an image signal converter 20. The MPEG decoder 3a is connected via the IEEE 1394 I/F 9b over IEEE 1394 to the MPEG recording and playback device 103 and decodes MPEG data fed from the MPEG recording and playback device 103. The IEEE 1394 I/F 9b exchanges an MPEG stream and the like with the MPEG recording and playback device 103 in accordance with the IEEE 1394 standard. The image signal superimposing unit 18 superimposes an image signal generated by the image signal converter 20 converting BPM data and an image signal generated by the MPEG decoder 3a decoding MPEG data, and outputs a resultant signal for display, for example. The image signal converter 20 converts BMP data obtained from the IEEE 1394 I/F 9b into a displayable image signal.

Now, a description is made of the operation of the MPEG recording and playback device 103 according to the third preferred embodiment when displaying reproduced pertinent information on program on the external equipment 104. Here, the operation of the MPEG recording and playback device 103 when recording MPEG data fed from the IEEE 1394 I/F 9a on the magnetic tape 8 through for example, the D-VHS signal processor 4 is identical to that described in the first preferred embodiment of the present invention and thus, the description thereof will be omitted.

Referring to FIG. 5, the MPEG recording and playback device 103, like the device according to the first preferred embodiment, can record pertinent information on program on the magnetic tape 8. MPEG data recorded on the magnetic tape 8 is converted from a magnetic pattern into an electric signal by the rotating head 7 and fed to the recording and playback amplifier 6.

The recording and playback amplifier 6 performs processing such as waveform equalization and phase compensation on the received electric signal for minimizing magnetic-media-specific waveform distortion and the like, and transmits a resultant signal as a playback signal via the selection switch 5 to the D-VHS signal processor 4.

The D-VHS signal processor 4 creates a data block compliant with the D-VHS standard for the playback signal fed from the selection switch 5, decomposes data into MPEG-TS packets after performing error correction processing, and outputs resultant MPEG data via the IEEE 1394 I/F 9a to the external equipment 104. The outputted MPEG data is fed via the IEEE 1394 I/F 9b to the MPEG decoder 3a.

The D-VHS signal processor 4 also extracts pack data stored in the previously described Data AUX and transmits it to the program information collecting unit 14b. The program information collecting unit 14b transmits the pertinent information on program received from the D-VHS signal processor 4 to the BMP converter 19.

Recently, various forms of digital home appliances compliant with the IEEE 1394 standard have been proposed and standards for such appliances have been developed. The EIA 775 is one of such standards. The EIA 775 is a standard developed on the assumption that digital cable broadcast receivers are used while being connected with other digital broadcast receivers. The principal point of this standard is that an image of a control panel of to-be-controlled equipment is displayed on the control equipment side to allow equipment for program display and viewing to have control over other receivers, whereby viewers can indirectly control the to-be-controlled equipment. More specifically, to-be-controlled equipment controlled by other equipment transmits image data of its control panel to operate the control of the to-be-controlled equipment itself over IEEE 1394 to control equipment, and then, the control equipment displays the received image data in its operating environment thereby to gain indirect control over the to-be-controlled equipment.

Referring to FIG. 5, the BMP converter 19 converts the received pertinent information on program into displayable BMP data and transmits it via the IEEE 1394 I/F 9a to the external equipment 104. The BMP data outputted from the IEEE 1394 I/F 9a is transmitted together with MPEG data over IEEE 1394 to the IEEE 1394 I/F 9b. The IEEE 1394 I/F 9b receives and transfers the BMP data to the image signal converter 20. The image signal converter 20 converts and outputs the BMP data as a displayable image signal.

The MPEG data received at the IEEE 1394 I/F 9b is fed to the MPEG decoder 3a, in which it is MPEG decoded into an analog image signal and outputted to the image signal superimposing unit 18 together with the analog image signal obtained by the image signal converter 20 converting the BMP data. The image signal superimposing unit 18 superimposes both the received image signals and outputs one image signal, thereby providing the same to viewers.

As above described, the MPEG recording and playback device 103 according to the third preferred embodiment of the present invention converts pertinent information on program into BMP data and transmits it to the external equipment 104. Then, pertinent information on program is extracted from the BMP data by the image signal converter 20, converted into an image signal, and superimposed on an MPEG decoded image signal of a program. Thereby, program information can be displayed and provided to viewers.

While the invention has been shown and described in detail, the foregoing description is in all aspects illustrative and not restrictive. It is therefore understood that numerous modifications and variations can be devised without departing from the scope of the invention.

What is claimed is:

1. An MPEG data collecting device which is connected to a recording device for recording MPEG data, comprising:
    information collecting unit for, during recording of MPEG data, collecting pertinent information on program contained in said MPEG data; and
    at least any one of an IEEE 1394 interface receiving input of said MPEG data, an MPEG encoder encoding an analog signal fed from the outside to generate MPEG data, and a digital broadcast receiver receiving a digital broadcast, wherein
    when said MPEG data is input from either said IEEE 1394 interface or said MPEG encoder, said information collecting unit obtains the date and time when recording of said MPEG data started and a program number stored in a PMT in said MPEG data as said pertinent information on program, and
    when said MPEG data is input from said digital broadcast receiver, said information collecting unit obtains said pertinent information on program by sequentially referring to a predetermined data table other than said PMT in said MPEG data in accordance with a plurality of different predetermined broadcasting standards and, if desired pertinent information on program cannot be obtained by reference to said predetermined data table, obtains the date and time when recording of said MPEG data started and a program number stored in said PMT in said MPEG data as said pertinent information on program.

2. The MPEG data collecting device according to claim 1, wherein when said MPEG data to be recorded is input from either said IEEE 1394 interface or said MPEG encoder, said information collecting unit keeps holding said pertinent information on program obtained at the start of recording until the contents of a PAT and/or a PMT in said MPEG data is updated and, at the time when the contents of at least one of said PAT and said PMT in said MPEG data is updated, updates said pertinent information on program held therein.

3. The MPEG data collecting device according to claim 1, wherein when said MPEG data to be recorded is input from said digital broadcast receiver, if said pertinent information on program can be obtained from said predetermined data table in said MPEG data, said information collecting unit checks whether information about at least one of an SI and a PSI in said MPEG data has been updated at regular time intervals and, every time said information was updated, updates said pertinent information on program, and if said pertinent information on program cannot be obtained from said predetermined data table in said MPEG data, said information collecting unit keeps holding said pertinent information on program obtained at the start of recording of said MPEG data until the contents of at least one of a PAT and a PMT in said MPEG data are updated and, at the time when the contents of at least one of said PAT and said PMT are updated, updates said pertinent information on program held therein.

* * * * *